United States Patent
Viswanathan et al.

(10) Patent No.: US 11,061,806 B2
(45) Date of Patent: Jul. 13, 2021

(54) SELF-CORRECTING DEPENDENT SOFTWARE UPGRADES

(71) Applicant: Bank of America Corporation, Charlotte, NC (US)

(72) Inventors: Vinu Viswanathan, Tamil Nadu (IN); Sundarrajan Raman, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/549,200

(22) Filed: Aug. 23, 2019

(65) Prior Publication Data

US 2021/0056007 A1 Feb. 25, 2021

(51) Int. Cl.
| | |
|---|---|
| *G06F 8/71* | (2018.01) |
| *G06F 11/36* | (2006.01) |
| *G06N 20/00* | (2019.01) |
| *G06F 8/10* | (2018.01) |

(52) U.S. Cl.
CPC .......... *G06F 11/3624* (2013.01); *G06F 8/10* (2013.01); *G06F 8/71* (2013.01); *G06F 11/3684* (2013.01); *G06F 11/3688* (2013.01); *G06N 20/00* (2019.01)

(58) Field of Classification Search
CPC .... G06F 11/3664; G06F 11/3688; G06F 8/65; G06F 8/71
See application file for complete search history.

(56) References Cited

U.S. PATENT DOCUMENTS

| | | | |
|---|---|---|---|
| 8,694,964 B1* | 4/2014 | Picard | ........................ G06F 8/73 717/123 |
| 9,170,921 B2 | 10/2015 | N'Gum et al. | |
| 9,189,317 B1 | 11/2015 | Marimuthu | |
| 9,286,188 B1 | 3/2016 | Chopra et al. | |
| 9,442,830 B1* | 9/2016 | Zhang | ................. G06F 11/3676 |
| 9,483,384 B2 | 11/2016 | Yoshida | |
| 9,684,507 B2 | 6/2017 | Mallisetty et al. | |
| 9,690,567 B2* | 6/2017 | Bhat | ........................ G06F 8/65 |
| 9,740,473 B2 | 8/2017 | Kumar et al. | |
| 9,983,981 B1 | 5/2018 | Mundada et al. | |
| 10,114,637 B1 | 10/2018 | Willson et al. | |
| 10,133,651 B2 | 11/2018 | Paulraj et al. | |
| 10,140,201 B2 | 11/2018 | Purushothaman | |

(Continued)

*Primary Examiner* — Duy Khuong T Nguyen
(74) *Attorney, Agent, or Firm* — Banner & Witcoff, Ltd.; Michael A. Springs

(57) ABSTRACT

Aspects of the disclosure relate to self-correcting dependent software upgrades. A computing platform may scan a software source code and parse release notes associated with the source code. The computing platform may identify a code modification to be performed on dependent source code, and may identify a code segment of the dependent source code. Then, the computing platform may retrieve, based on a machine learning model, a code fix for the code segment, and a test case associated with the code modification. The computing platform may update the code segment by applying the code fix, and may merge the updated code segment with the dependent source code. Then, the computing platform may run the test case on the modified source code. Then, the computing platform may determine an outcome for the modified source code, and may initiate, based on the outcome, an action related to the dependent source code.

24 Claims, 9 Drawing Sheets

(56) References Cited

U.S. PATENT DOCUMENTS

| | | | | |
|---|---|---|---|---|
| 2009/0328025 | A1* | 12/2009 | Johnson | G06F 8/71 |
| | | | | 717/170 |
| 2012/0324417 | A1* | 12/2012 | Somani | G06F 9/44 |
| | | | | 717/101 |
| 2019/0306173 | A1* | 10/2019 | Reddy | H04L 63/126 |
| 2020/0057622 | A1* | 2/2020 | Shtein | G06F 8/30 |

* cited by examiner

SELF-CORRECTING DEPENDENT SOFTWARE UPGRADES

BACKGROUND

Aspects of the disclosure relate to deploying digital data processing systems to automatically upgrade and test software applications in an enterprise system. In particular, one or more aspects of the disclosure relate to self-correcting dependent software upgrades.

Enterprise organizations may utilize various software applications to support their computing infrastructure. Such software applications may undergo changes based on modifications to an underlying source code. Ensuring that changes to the underlying source code are properly identified, and timely and targeted upgrades are performed to ensure a smooth running of the software application, and minimize an impact of changes to the source code to enterprise services, may be highly advantageous to maintain an efficient and stable computing infrastructure. In many instances, however, it may be difficult to perform upgrades with speed and accuracy while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with dependent software upgrades.

In accordance with one or more embodiments, a computing platform having at least one processor, a communication interface, and memory may identify, via a computing device and for a first software application based on a first source code, a second software application, where the first software application is dependent on the second software application. Then, the computing platform may scan, via the computing device, a second source code for the second software application. Then, the computing platform may parse, via the computing device, release notes associated with the second source code. Then, the computing platform may identify, via the computing device and based on the release notes, a code modification to be performed for the first source code. Subsequently, the computing platform may identify, via the computing device and based on the code modification, a code segment of the first source code. Then, the computing platform may retrieve, from a repository and based on a machine learning model, a code fix for the code segment, and a test case associated with the code modification. Then, the computing platform may update the code segment by applying the code fix. Subsequently, the computing platform may merge the updated code segment with the source code. Then, the computing platform may run, via the computing device, the test case on the modified first source code. Then, the computing platform may determine, based on running the test case, an outcome for the modified first source code. Subsequently, the computing platform may initiate, based on the outcome, an action related to the first source code.

In some embodiments, the computing platform may generate the test case based on the machine learning model.

In some embodiments, the computing platform may generate, based on the outcome, feedback related to the code fix. Subsequently, the computing platform may update, based on the feedback related to the code fix, the repository. In some embodiments, the computing platform may train the machine learning model based on the feedback related to the code fix.

In some embodiments, the computing platform may generate, based on the outcome, feedback related to the test case. Subsequently, the computing platform may update, based on the feedback related to the test case, the repository. In some embodiments, the computing platform may train the machine learning model based on the feedback related to the test case.

In some embodiments, the outcome may be a pass outcome, and the initiating the action may include releasing the updated code segment for distribution.

In some embodiments, the outcome may be a fail outcome, and the initiating the action may include re-performing the retrieving the code fix and the test case, and the computing platform may retrieve, based on the machine learning model, an additional code fix and an additional test case. In some embodiments, the computing platform may continue the re-performing the retrieving the code fix and the test case until the outcome is a pass outcome. In some embodiments, the retrieving the additional test case may be based on one or more of a regression pack, a performance criterion, a mock test, a functional test, and a page load time.

In some embodiments, the computing platform may identify, via the computing device and based on the release notes, an additional code modification to be performed, and where the identifying the additional code modification may be re-performed until the release notes are resolved.

In some embodiments, the computing platform may determine if the code modification can be performed on the first source code.

In some embodiments, the release notes may include change logs.

In some embodiments, the parsing the release notes may be performed based on natural language processing techniques.

In some embodiments, the release notes may include a plurality of items, and the computing platform may classify each item into an item type, and where the item type may be one of enhancement with a new feature, a bug fix, a removal of an application programming interface, a change to an interface, and a change to an existing feature, and where the code modifications are based on the item type.

In some embodiments, the item type may be a change to an interface, and the computing platform may identify an alternate interface.

In some embodiments, the item type may be a removal of an application programming interface, and the computing platform may identify a replacement application programming interface.

In some embodiments, the computing platform may determine, based on the release notes, a performance impact on the first software application. Then, the computing platform may identify, based on the machine learning model, a test case to mitigate the performance impact.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
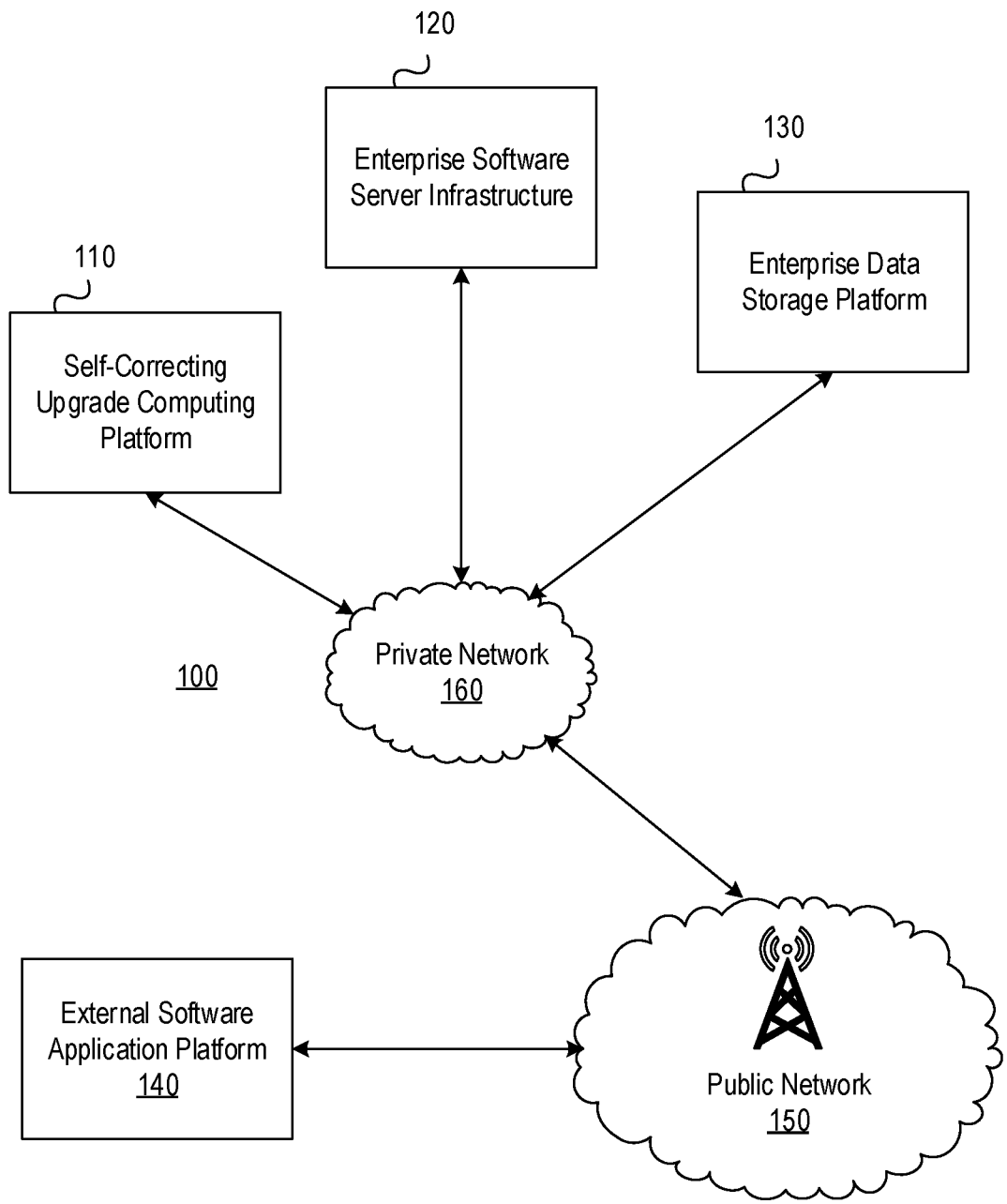
FIGS. 1A and 1B depict an illustrative computing environment for self-correcting dependent software upgrades in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to self-correcting dependent software upgrades. For example, an enterprise software server infrastructure may deploy computing resources such as software applications. In some instances, a dependent software application may be dependent on one or more primary software applications, and these primary software applications may be modified. Accordingly, functionality of the dependent software application within the enterprise software server infrastructure may be impacted. Manual methods to upgrade the source code for the dependent software application generally may not provide a robust upgrade. For example, in processing upgrades to a base container image, the source code needs to be analyzed, modified and tested. A manual process for performing the upgrade may not always be effective. For example, time spent on identifying bug fixes, and in performing tests, may be considerably long, and may result in errors, and/or incomplete solutions. In some instances, the test cases may not be appropriately identified. Accordingly, aspects of this disclosure relate to an automated upgrade system that utilizes a machine learning model to learn from past upgrade processes, and identifies code fixes that need to be applied to update relevant code segments of a software application, and identifies test cases that need to be run on the updated software.

For example, release notes related to primary software application and/or frameworks and images related to a primary source code may be parsed by utilizing natural language processing. The release notes may then be analyzed for an impact to the dependent software application. Such an analysis may then enable detection of applicable code fixes that may need to be applied to the dependent source code to minimize impact to the dependent software application. In some instances, machine learning models may be trained based on feedback loops related to historical code fixes, and such machine learning models may be utilized to detect and apply relevant code fixes. Likewise, machine learning models may be trained based on feedback loops related to historical test cases to test modifications to the source code, and such machine learning models may be utilized to detect and apply relevant test cases. In some instances, the machine learning models may be utilized to create new test cases that may be applicable to the modified first source code.

As disclosed herein, the source code may be iteratively updated so as to resolve issues arising from the release notes. Testing may be automatically performed to ensure that tasks such as compilation, run time, exception handling, and impacts to interfaces are resolved successfully. In some instances, the source code may be tested and modified based on appropriate performance criteria, such as, for example, concurrency, load, memory leaks and garbage collections. Test cases may also be iteratively updated, for example, as they relate to regression pack, performance, mock testing, functional testing, page load time, and so forth. Also, as disclosed herein, source code updates may be automatically identified based on change logs and release notes for dependency and/or image upgrades. Accordingly, as disclosed herein, aspects of this disclosure relate to improving the functioning of a computer. Also, for example, aspects of this disclosure relate to performing tasks on a computer that may not be performed as mental steps, thereby resulting in performance enhancements for computer systems with dependent software applications. As another example, aspects of this disclosure relate to special purpose computers that are configured to enable self-correcting dependent software upgrades as described herein.

Figure 1B:
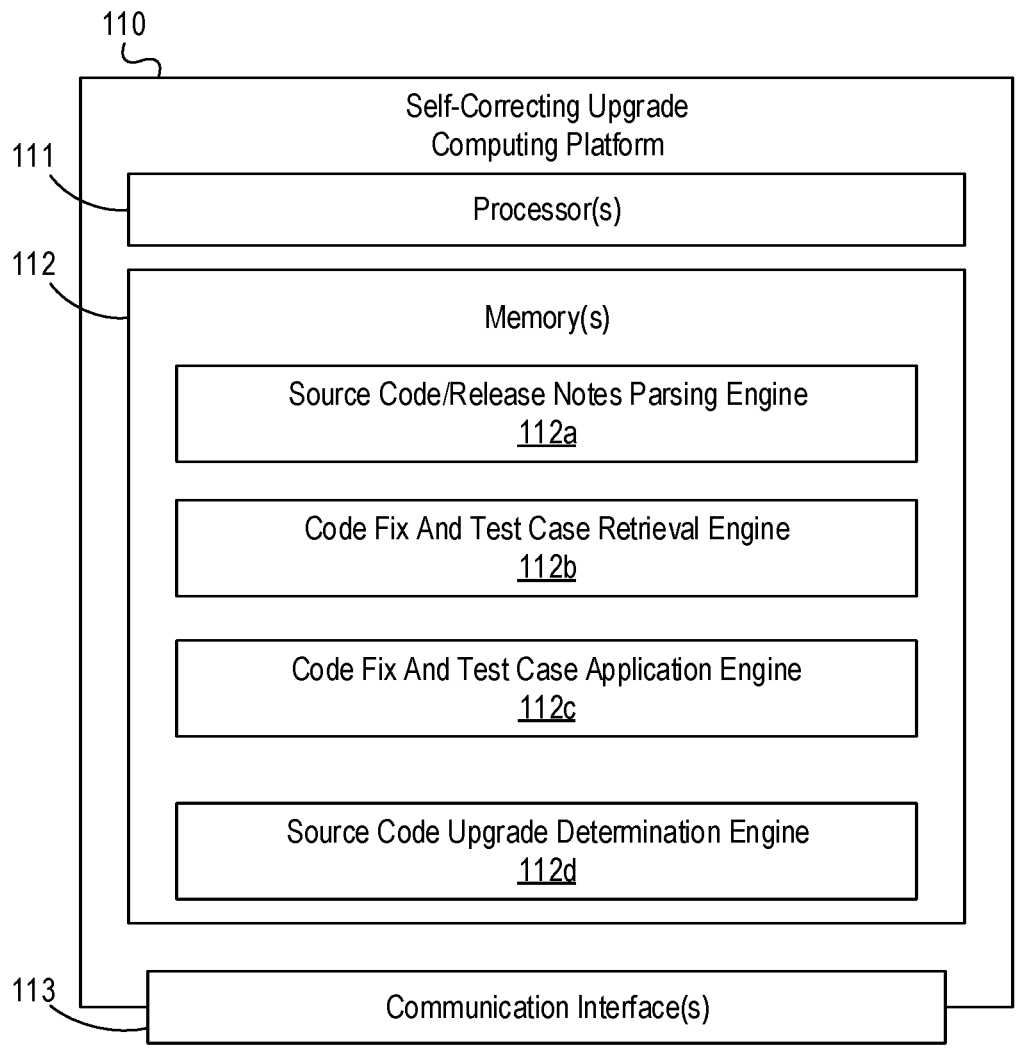

FIGS. 1A and 1B depict an illustrative computing environment for self-correcting dependent software upgrades in accordance with one or more example embodiments. Referring to FIG. 1A, computing environment 100 may include one or more computer systems. For example, computing environment 100 may include self-correcting upgrade computing platform 110, enterprise software server infrastructure 120, enterprise data storage platform 130, and external software application platform 140.

As illustrated in greater detail below, self-correcting upgrade computing platform 110 may include one or more computing devices configured to perform one or more of the functions described herein. For example, self-correcting upgrade computing platform 110 may include one or more computers (e.g., laptop computers, desktop computers, servers, server blades, or the like) and/or other computer components (e.g., processors, memories, communication interfaces).

Enterprise software server infrastructure 120 may include one or more computing devices and/or other computer components (e.g., processors, memories, communication interfaces). In addition, enterprise software server infrastructure 120 may be configured to host, execute, and/or otherwise provide one or more enterprise applications. For example, enterprise software server infrastructure 120 may be configured to host, execute, and/or otherwise provide a software application for user devices, and/or other programs associated with an enterprise server. In some instances, enterprise software server infrastructure 120 may be configured to provide various enterprise and/or back-office computing functions for an enterprise organization, such as a financial institution. For example, enterprise software server infrastructure 120 may include various servers and/or databases that store and/or otherwise maintain account information, such as financial account information including account balances, transaction history, account owner information, and/or other information. Additionally, or alternatively, enterprise software server infrastructure 120 may receive instructions from self-correcting upgrade computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. Additionally, or alternatively, enterprise software server infrastructure 120 may be configured to store and/or otherwise maintain source code for software applications. For example, enterprise software server infrastructure 120 may be configured to store and/or otherwise maintain a history of code fixes and test cases and feedback related to the code fixes and test case. Additionally, or alternatively, enterprise software server infrastructure 120 may load data from enterprise data storage platform 130, manipulate and/or otherwise process such data, and return modified data and/or other data to enterprise data storage platform 130 and/or to other computer systems included in computing environment 100.

Computing environment 100 also may include one or more networks, which may interconnect one or more of self-correcting upgrade computing platform 110, enterprise software server infrastructure 120, enterprise data storage platform 130, and external software application platform 140. For example, computing environment 100 may include private network 160 (which may interconnect, for example, self-correcting upgrade computing platform 110, enterprise software server infrastructure 120, and enterprise data storage platform 130, and/or one or more other systems which may be associated with an organization, such as a financial institution) and public network 150 (which may interconnect, for example, external software application platform 140 with private network 160 and/or one or more other systems, public networks, sub-networks, and/or the like). Public network 150 may be a high generation cellular network, such as, for example, a fifth generation ("5G") or higher cellular network. In some embodiments, private network 160 may likewise be a high generation cellular enterprise network, such as, for example, a 5G or higher cellular network.

In one or more arrangements, self-correcting upgrade computing platform 110, enterprise software server infrastructure 120, enterprise data storage platform 130, and external software application platform 140, and/or the other systems included in computing environment 100 may be any type of computing device capable of communicating with a user interface, receiving input via the user interface, and communicating the received input to one or more other computing devices. For example, self-correcting upgrade computing platform 110, enterprise software server infrastructure 120, enterprise data storage platform 130, and external software application platform 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of self-correcting upgrade computing platform 110, enterprise software server infrastructure 120, enterprise data storage platform 130, and external software application platform 140, may, in some instances, be special-purpose computing devices configured to perform specific functions.

Referring to FIG. 1B, self-correcting upgrade computing platform 110 may include one or more processors 111, memory 112, and communication interface 113. A data bus may interconnect processor 111, memory 112, and communication interface 113. Communication interface 113 may be a network interface configured to support communication between self-correcting upgrade computing platform 110 and one or more networks (e.g., public network, private network, a local network, or the like). Memory 112 may include one or more program modules having instructions that when executed by processor 111 cause self-correcting upgrade computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of self-correcting upgrade computing platform 110 and/or by different computing devices that may form and/or otherwise make up self-correcting upgrade computing platform 110. For example, memory 112 may have, store, and/or include source code/release notes parsing engine 112a, code fix and test case retrieval engine 112b, code fix and test case application engine 112c, and source code upgrade determination engine 112d. Source code/release notes parsing engine 112a may have instructions that direct and/or cause self-correcting upgrade computing platform 110 to identify, via a computing device and for a first software application based on a first source code, a second software application, where the first software application is dependent on the second software application. Source code/release notes parsing engine 112a may also have instructions that direct and/or cause self-correcting upgrade computing platform 110 to scan, via the computing device, a second source code for the second software application, as discussed in greater detail below. Source code/release notes parsing engine 112a may also have instructions that direct and/or cause self-correcting upgrade computing platform 110 to parse, via the computing device, release notes associated with the second source code. Code fix and test case retrieval engine 112b may have instructions to identify, via the computing device and based on the release notes, a code modification to be performed for the first source code. Code fix and test case retrieval engine 112b may also have instructions to identify, via the computing device and based on the code modification, a code segment of the first source code. Code fix and test case retrieval engine 112b may have instructions to retrieve, from a repository and based on a machine learning model, a code fix for the code segment, and a test case associated with the code modification. Code fix and test case application engine 112c may have instructions to update the code segment by applying the code fix. Code fix and test case application engine 112c may have instructions to merge the updated code segment with the first source code and subsequently run, via the computing device, the test case on the modified first source code. Source code upgrade determination engine 112d may have instructions to determine, based on the running the test case, an outcome for the modified first source code. Source code upgrade determination engine 112d may have instructions to initiate, based on the outcome, an action related to the first source code.

Figure 2A:
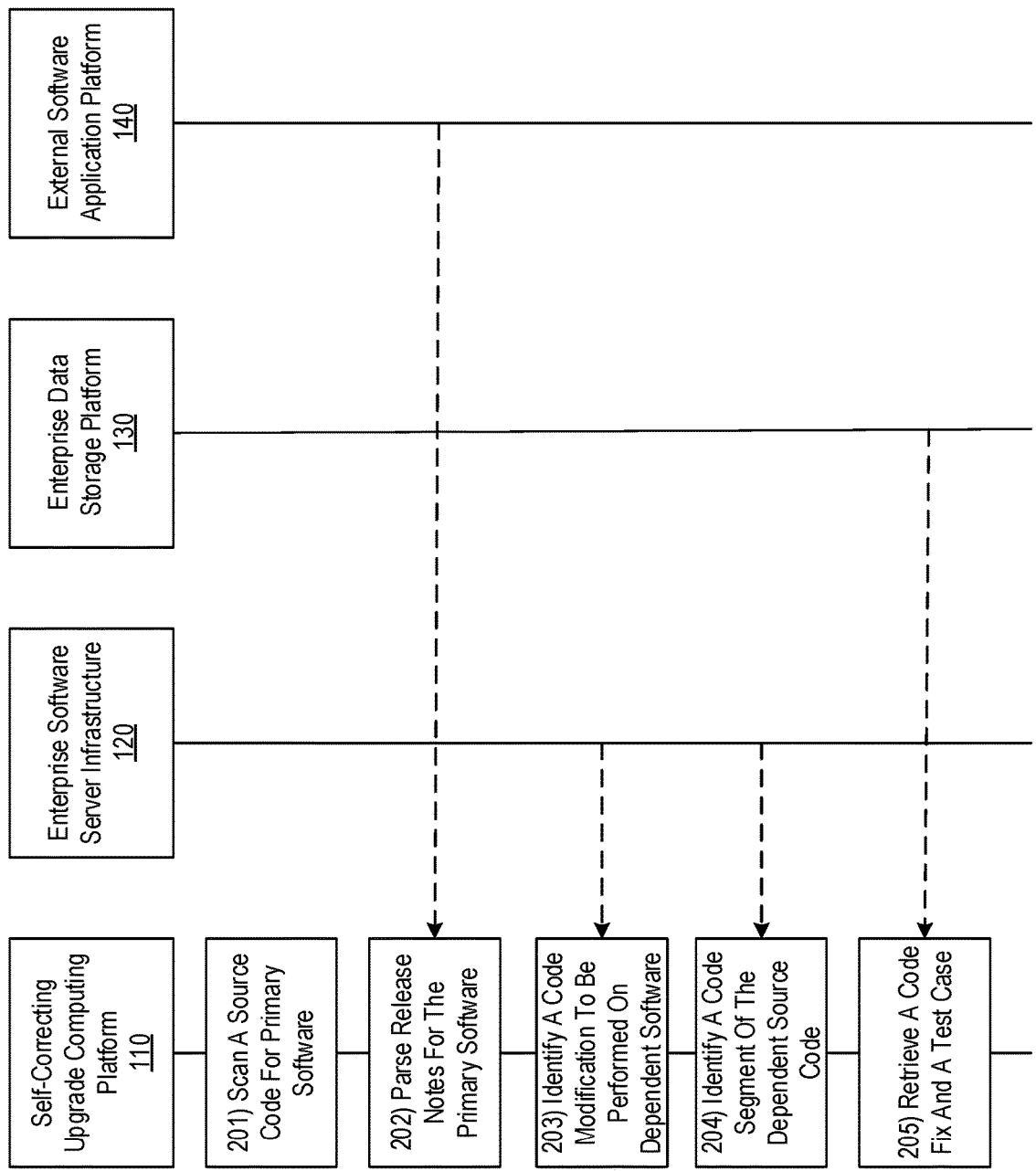
FIGS. 2A-2C depict an illustrative event sequence for self-correcting dependent software upgrades in accordance with one or more example embodiments.
Figure 2B:
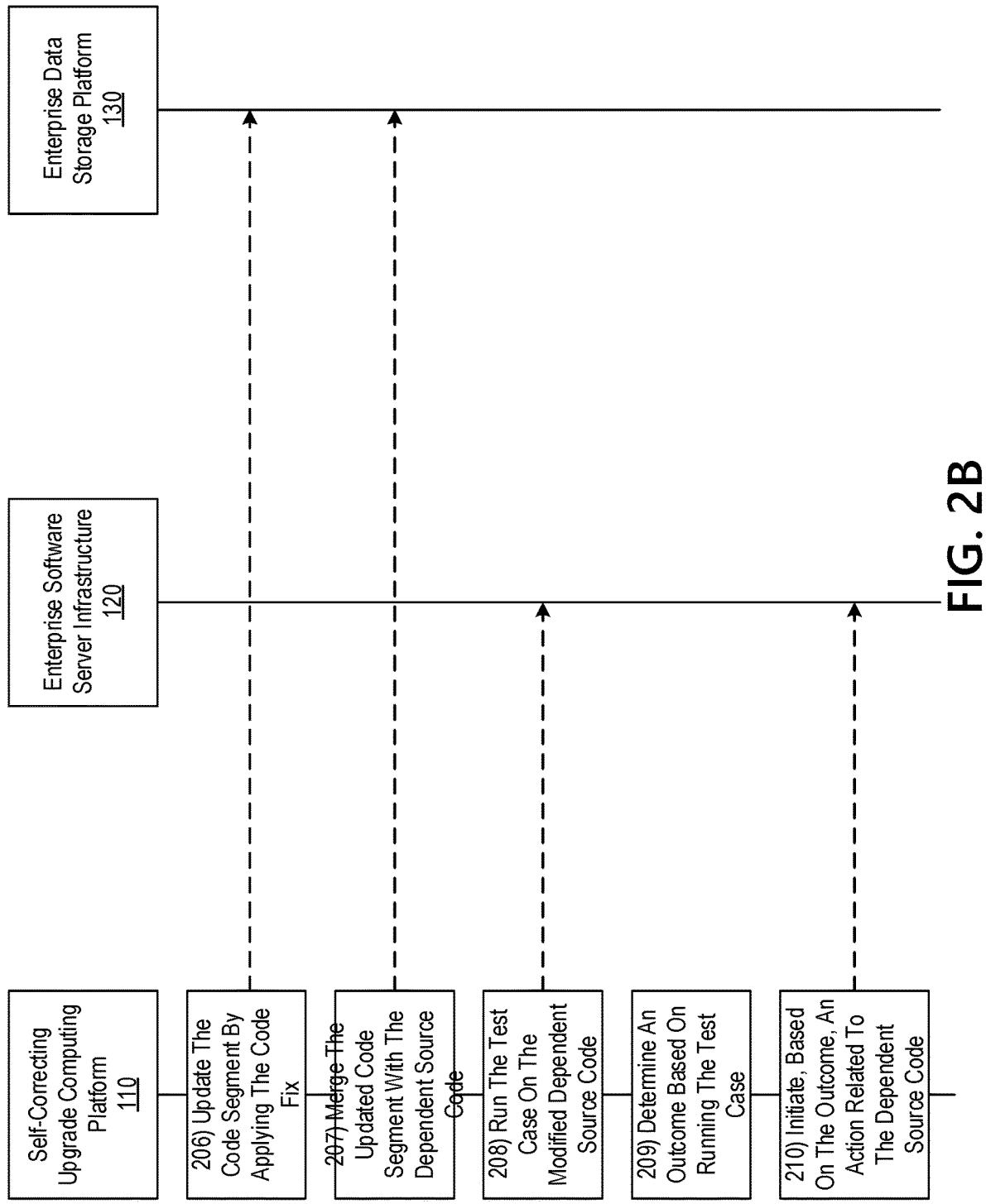
Figure 2C:
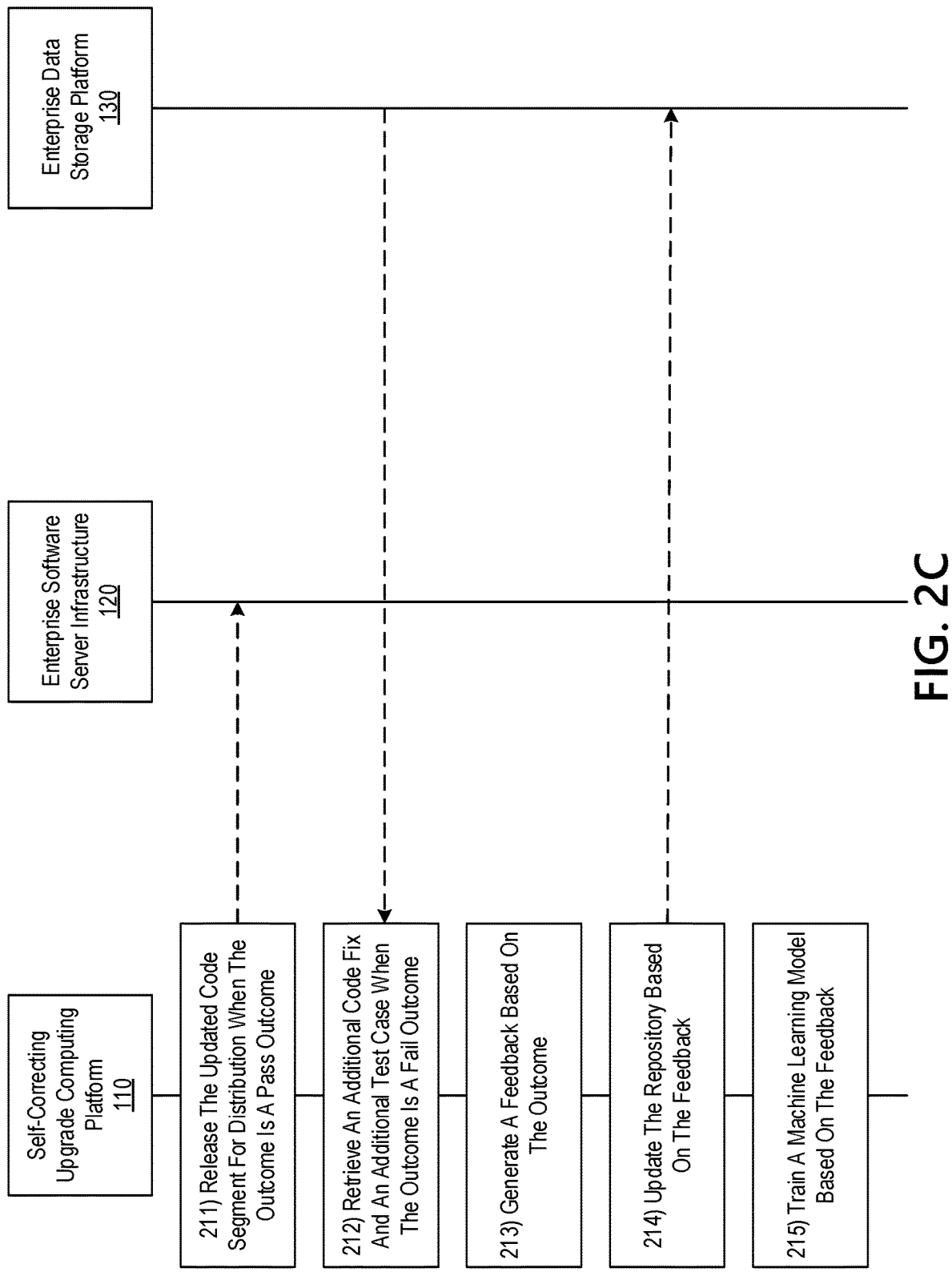

FIGS. 2A-2C depict an illustrative event sequence for self-correcting dependent software upgrades in accordance with one or more example embodiments. Referring to FIG. 2A, at step 201, self-correcting upgrade computing platform 110 may identify, via a computing device and for a first software application based on a first source code, a second software application, where the first software application is dependent on the second software application. For example, enterprise software server infrastructure 120 may deploy the first software application that may be a java-based application. Accordingly, the second software application may be the java application. Any changes to the underlying java application, may affect the first software application. For example, a method call in the java application may undergo a name change. Also, for example, an application programming interface ("API") may be removed. Such changes in the second software application (also referred to herein as a primary software application) may affect functionality of the first software application (also referred to herein as a dependent software application). Also, for example, the first software application, for example, ABC, may be dependent on a plurality of software applications, such as, for example, X, Y, and Z. Any changes to, say software applications Y and Z, may affect functionality of the first software application.

In some embodiments, self-correcting upgrade computing platform 110 may scan, via the computing device, a second source code for the second software application. For example, self-correcting upgrade computing platform 110 may scan the source code for the java application upon which the first software application is based. In some embodiments, such scanning may be performed and the source code may be analyzed via another tool for language recognition ("ANTLR"). The output source code may be provided to a repository (e.g., enterprise data storage platform 130) where files, functional variables, and types associated with the source code may be stored. Generally, a source code may be scanned, processed, and data is stored in the repository (e.g., enterprise data storage platform 130).

At step 202, self-correcting upgrade computing platform 110 may parse, via the computing device, release notes associated with the second source code. For example, self-correcting upgrade computing platform 110 may monitor the second source code and determine that changes have been made. Accordingly, self-correcting upgrade computing platform 110 may retrieve release notes corresponding to the changes. In some embodiments, the release notes may include change logs. In some embodiments, such release notes may be retrieved from an open source platform (e.g., an external software application platform 140). Self-correcting upgrade computing platform 110 may parse the release notes to identify changes that may need to be made to the first source code for the first software application, so as to conform to the changes to the second source code, and maintain functionality for the first software application.

In some embodiments, the release notes may include a plurality of items, and self-correcting upgrade computing platform 110 may determine, for each item, an item type, and where the item type may be one of an enhancement with a new feature, a bug fix, a removal of an application programming interface ("API"), a change to an interface, and a change to an existing feature. In some embodiments, self-correcting upgrade computing platform 110 may parse the release notes based on natural language processing ("NLP") techniques. Also, for example, in some embodiments, self-correcting upgrade computing platform 110 may apply text processing to the release notes prior to determining an item type.

At step 203, self-correcting upgrade computing platform 110 may identify, via the computing device and based on the release notes, a code modification to be performed. For example, for each identified item type, self-correcting upgrade computing platform 110 may identify a plurality of code modifications. In some embodiments, the code modification may be based on the item type. For example, if the item type is an enhancement, the code modification may be an addition of a code segment. Also, for example, if the item type is a bug fix, the code modification may be modification, alteration, and/or deletion of a code segment to fix the bug. As another example, if the item type is a removal of an API, the code modification may be removal of the API and replacement of that API with a corrected API. In some embodiments, self-correcting upgrade computing platform 110 may identify the replacement API. As another example, if the item type is an interface change, the code modification may be an alternate interface. In some embodiments, self-correcting upgrade computing platform 110 may identify the alternate interface.

In some embodiments, self-correcting upgrade computing platform 110 may determine if the code modification may be performed on the first source code. For example, the first software application may be dependent on underlying software applications Y and Z. In some embodiments, a change in software application Y may be incompatible with a change in software application Z. Accordingly, self-correcting upgrade computing platform 110 may determine that the code modification may not be performed on the first source code. Also, for example, a change in software application Y may require additional access permissions for a new API. Accordingly, self-correcting upgrade computing platform 110 may determine that the code modification may not be performed on the first source code. In some embodiments, self-correcting upgrade computing platform 110 may identify such a conflict, and take additional steps to resolve the conflict. For example, self-correcting upgrade computing platform 110 may scan the source code for software application Z and identify code modifications that may be applied to resolve the conflict with the code modification applied to software application Y. Also, for example, self-correcting upgrade computing platform 110 may generate an automatic request for access to the new API.

At step 204, self-correcting upgrade computing platform 110 may identify, via the computing device and based on the code modification, a code segment of the source code. As described herein, items on the release notes may be associated with different segments of the first source code. Accordingly, self-correcting upgrade computing platform 110 may identify the code modifications, and may determine the code segments that may be affected by the code modifications. For example, if the code modification is identified as a name change for a method call, then self-correcting upgrade computing platform 110 may identify code segments that call the affected method.

At step 205, self-correcting upgrade computing platform 110 may retrieve, from a repository and based on a machine learning model, a code fix for the code segment, and a test case associated with the code modification. For example, historical data for past code fixes and test cases applied may be stored in a repository (e.g., enterprise data storage platform 130). Self-correcting upgrade computing platform 110 may retrieve the code fix and the test case from the repository. In some embodiments, a machine learning model may identify an appropriate code fix. For example, the machine learning model may analyze historical data based on code fixes that are associated with code modifications and/or code segments, and the machine learning model may be trained to learn code fixes that may have been successful for the associated code modifications and/or code segments. Also, for example, the machine learning model may be trained to learn code fixes associated with the second software application, and/or the second source code. In like manner, the machine learning model may analyze historical data based on test cases that are associated with code modifications and/or code segments, and the machine learning model may be trained to identify test cases that may have been relevant for the associated code modifications and/or code segments. Also, for example, the machine learning model may be trained to learn test cases associated with the second software application, and/or the second source code.

In some embodiments, self-correcting upgrade computing platform 110 may generate the test case based on the machine learning model. For example, the machine language model may be utilized to identify and generate testing scripts for additions, changes, and fixes. For example, performance testing scripts may be identified for a performance change, functional test scripts may be identified for a functional change, and regression test scripts may be identified for a regression change. Also, for example, in some embodiments, self-correcting upgrade computing platform 110 may identify an impact on the first software application based on historical data from the repository (e.g., enterprise data storage platform 130). For example, self-correcting upgrade computing platform 110 may retrieve impact information related to different languages, and identify a performance change, a functional change and/or a regression change based on different programming languages. Also, for example, the machine language model may be utilized to generate test cases such as, for example, a regression pack, a performance test, a mock test, a functional testing, and page load time test.

In some embodiments, self-correcting upgrade computing platform 110 may determine, based on the release notes, a performance impact on the first software application. For example, self-correcting upgrade computing platform 110 may determine a performance impact based on one or more factors such as, for example, concurrency, load, memory leaks, and garbage collection. In some embodiments, self-correcting upgrade computing platform 110 may identify, based on the machine learning model, a test case to mitigate the performance impact.

Referring to FIG. 2B, at step 206, self-correcting upgrade computing platform 110 may update the code segment by applying the code fix. For example, self-correcting upgrade computing platform 110 may update the code segment by applying a name change for a method call. Also, for example, self-correcting upgrade computing platform 110 may update the code segment by deleting an API.

At step 207, self-correcting upgrade computing platform 110 may merge the updated code segment with the first source code. For example, self-correcting upgrade computing platform 110 may add the modified code segment to the first source code so as to run tests to determine if the code segment has been successfully modified.

At step 208, self-correcting upgrade computing platform 110 may run, via the computing device, the test case on the modified first source code. For example, self-correcting upgrade computing platform 110 may test the modified first source code to determine if the code fixes have been properly applied. In some embodiments, a plurality of test cases may need to be applied for any one code fix for an item type of the release items.

At step 209, self-correcting upgrade computing platform 110 may determine, based on the running the test case, an outcome for the modified first source code. For example, self-correcting upgrade computing platform 110 may determine that the modified first source code has either passed the test case, or has failed the test case. In some embodiments, the determining the outcome may be based on satisfying a predetermined threshold for a pass or a fail outcome. For example, self-correcting upgrade computing platform 110 may determine statistical margins of error based on a statistical distribution for error estimates, and the predetermined threshold may be determined to be within a range of the mean of the statistical distribution.

At step 210, self-correcting upgrade computing platform 110 may initiate, based on the outcome, an action related to the source code. For example, one or more actions may be initiated based on the outcome. For example, the repository (e.g., enterprise data storage platform 130) may be updated with data related to the outcome. Also, for example, another code segment may be identified for the process of applying code fixes and test cases to determine if there is an error in the process.

At step 211, self-correcting upgrade computing platform 110 may, when the outcome is a pass outcome, initiate the action by releasing the updated code segment for distribution. For example, self-correcting upgrade computing platform 110 may commit the updated code segment to the first source code. Also, for example, self-correcting upgrade computing platform 110 may associate the code fix and the test case with a pass outcome, and provide this association to the repository (e.g., enterprise data storage platform 130).

At step 212, self-correcting upgrade computing platform 110 may, when the outcome is a fail outcome, initiate the action by re-performing the retrieving the code fix and the test case, whereby self-correcting upgrade computing platform 110 may retrieve, based on the machine learning model, an additional code fix and an additional test case. For example, self-correcting upgrade computing platform 110 may iterate one or more steps in the process to make an appropriate modification to the code segment. For example, self-correcting upgrade computing platform 110 may identify an additional test case for the identified code fix and apply this additional test case to the code segment. Also, for example, self-correcting upgrade computing platform 110 may identify an additional code fix for the code modification, and identify an additional test case associated with this additional code fix, and apply this additional test case to the code segment. Generally, self-correcting upgrade computing platform 110 may continue the re-performing the retrieving the code fix and the test case until the outcome is a pass outcome.

In some embodiments, self-correcting upgrade computing platform 110 may identify, via the computing device and based on the release notes, an additional code modification to be performed. Once a first code modification is successfully resolved (the applied code fixes have been successfully tested and the modified code segment has been merged into the first source code and released), self-correcting upgrade computing platform 110 may identify a second code modification corresponding to an item on the release notes. Generally, for each item, self-correcting upgrade computing platform 110 may cycle through additional code modifications until these are successfully resolved.

In some instances, the identifying the additional code modification is re-performed until the release notes are resolved. For example, once code modifications for a first item on the release notes are successfully resolved, self-correcting upgrade computing platform 110 may identify a second item on the release notes, and proceed to resolve code modifications associated with the second item.

At step 213, self-correcting upgrade computing platform 110 may generate, based on the outcome, feedback related to the code fix and the test case. For example, self-correcting upgrade computing platform 110 may generate a feedback loop that tracks linkages between release notes items, code segments, code modifications, code fixes, test cases, and outcomes associated therewith.

At step 214, self-correcting upgrade computing platform 110 may update the repository based on the feedback. As described herein, self-correcting upgrade computing platform 110 may store data related to various aspects of the processes described herein in the repository (e.g., enterprise data storage platform 130).

At step 215, self-correcting upgrade computing platform 110 may train the machine learning model based on the respective feedback related to the code fix and the test case. For example, self-correcting upgrade computing platform 110 may utilize such feedback to dynamically train the machine learning model. For example, pairs of code fixes and test types may be associated with a pass outcome or a fail outcome, and the machine learning model, may over time, determine a likelihood of success for the pairs of code fixes and test types.

Figure 3A:
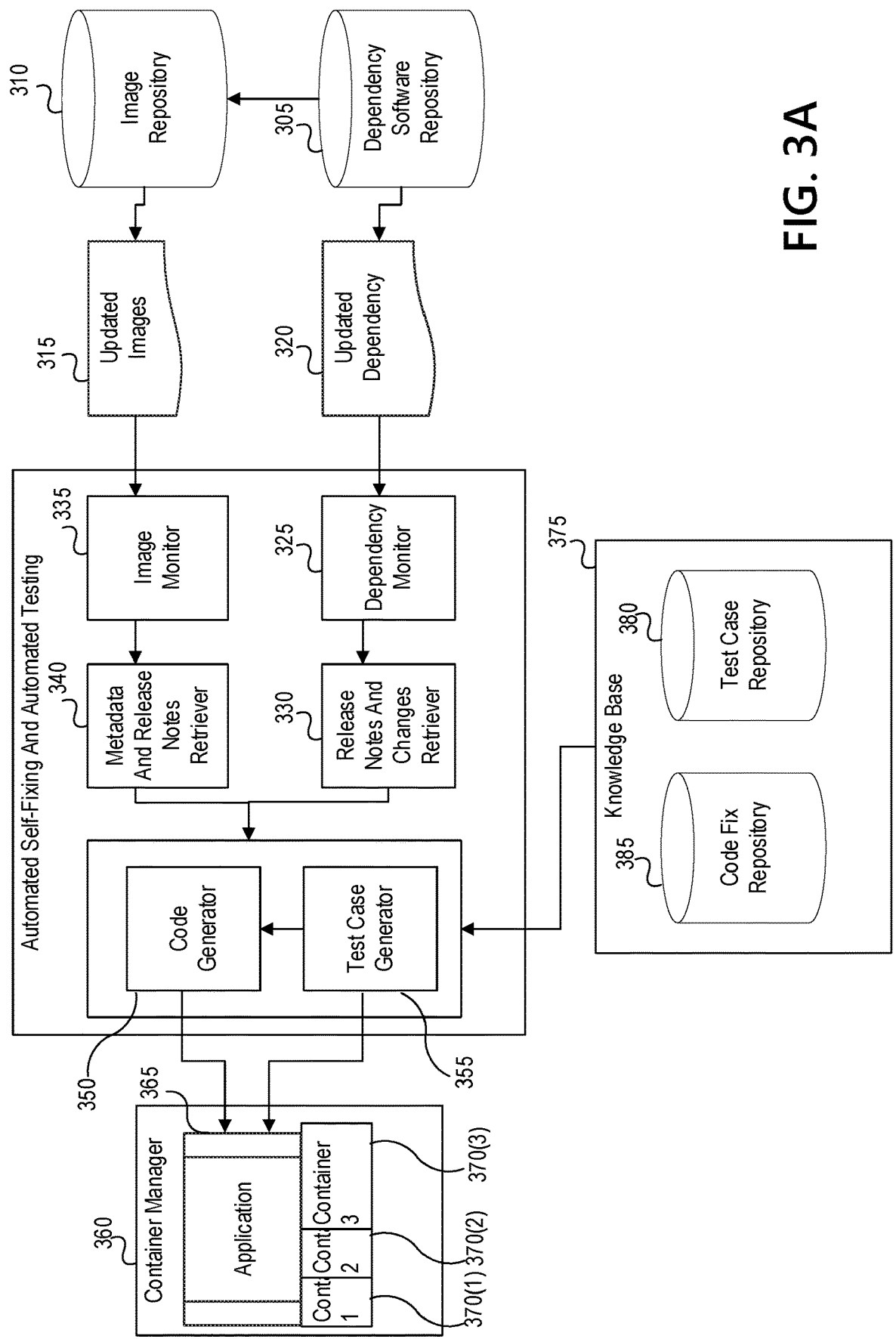
FIGS. 3A-3D depict illustrative methods for self-correcting dependent software upgrades in accordance with one or more example embodiments.

FIGS. 3A-3D depict illustrative methods for self-correcting dependent software upgrades in accordance with one or more example embodiments. Referring to FIG. 3A, at dependency software repository 305 (e.g., enterprise data storage platform 130) may include data related to a dependent software application and data related to primary software applications on which the dependent software application depends. Image repository 310 may include container images for the software applications. For example, the dependent software application may be a java-based application, and may include object files for a plurality of virtual machines. Based on changes to the underlying java code, the object files may need to be modified. Accordingly, the software application that is based on Java may need to be modified as well. Also, for example, the dependent software application may be a container-based application including a container image built for the application. Accordingly, the container image may incorporate a plurality of other images. For example the container image may incorporate an image of a Linux operating system, or, for example, an image for an open-source Java Servlet Container. Accordingly, updated images 315 relates to updated container images. Likewise, updated dependency 320 includes updated dependency information, such as, for example, dependencies of a java-based application to the underlying java code.

As an example, the dependent software application may be an upgrade to the open-source Java Servlet Container that undergoes a version change from Version 4 to Version 5. Accordingly, the computing platform may identify all container images Version 5 and identify all version changes in Version 4. Image monitor 335 monitors changes to container images, and dependency monitor 325 monitors changes to the dependencies. For example, depending on whether the dependent software application is java- or python-based, dependency monitor 325 may monitor and identify different sets of dependencies. In some embodiments, dependency monitor 325 may monitor and retrieve release notes from an open source web resource. Metadata and release notes retriever 340 may retrieve metadata changes and release notes based on information from image monitor 335. Also, release notes and changes retriever 330 may retrieve release notes and changes based on information from dependency monitor 325.

Subsequently, the computing platform may identify code modifications via code generator 350 that may need to be made and may generate test cases via test case generator 355. For example, a code modification may be a change in a "method call" related to an interface agreement or a change in an API. Accordingly, when the dependent software application utilizes the method call, it is unable to properly access the relevant directories. Code generator 350 may identify such a change, and modify all method calls and update them with a correct call. In some embodiments, code generator 350 may be updated with results from test case generator 355. Generally, code modifications may be based on a knowledge base 375, which may include a code fix repository 385, and a test case repository 380. In some embodiments, knowledge base 375 may be a repository of historical code fixes and test cases. In some embodiments, historical code fixes and test cases may be associated with pass and/or fail outcomes. In some embodiments, knowledge base 375 may be dynamically updated as a machine learning model is trained.

Code generator 350 and test case generator 355 may apply the code fixes and test cases to container manager 360. In some embodiments, container manager 360 may comprise dependent software application 365, which may further comprise a plurality of containers, such as for example, container 1 370(1), container 2 370(2), and container 3 370(3). As described herein, source code for application 365 may be updated via an iterative process until items on the release notes have been resolved.

Figure 3B:
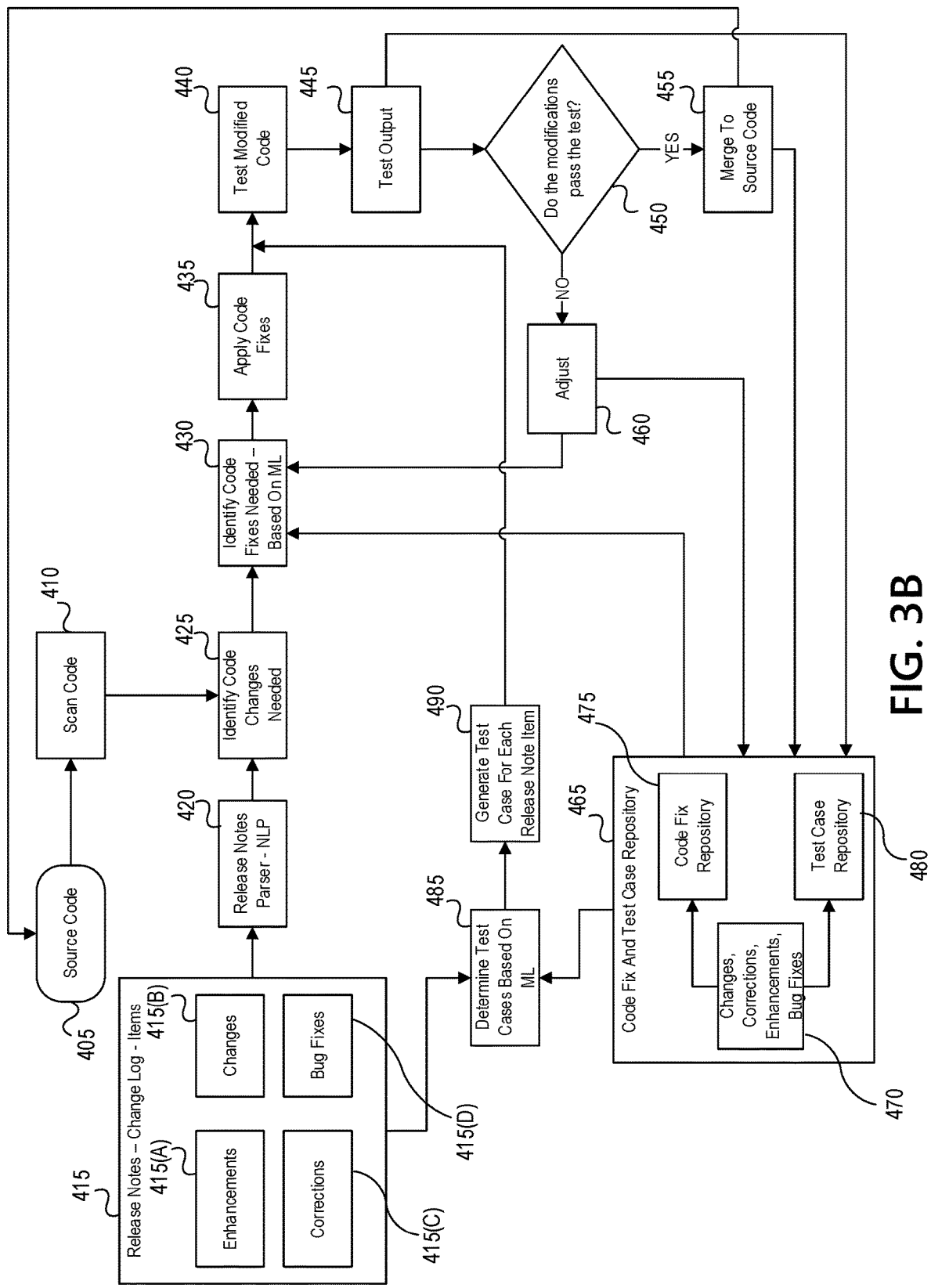

Referring to FIG. 3B, block 405 may represent application source code, and block 410 may represent scanning the application source code and retrieving information available from the source code. Block 415 may represent release notes, including change log items. As described herein, release notes may be enhancements 415(A), changes 415(B), corrections 415(C), and bug fixes 415(D). Block 415 may lead to release notes parser 420, that parses the release notes. In some embodiments, release notes may be pre-processed prior to being processed by release notes parser 420, and classified as enhancements 415(A), changes 415(B), corrections 415(C), and bug fixes 415(D).

In some embodiments, parsing may be performed by a natural language processor ("NLP"). For example, an application may be upgraded from Version 2.2 to 2.3. A method call was renamed from "UK" to "LMN". Accordingly, the computing platform may have to identify this change in the method name, and apply it to the source code for the dependent software application. Block 425 may identify such code changes based on an output from release notes parser 420 and based on scanning of the source code by block 410.

Block 415 may also lead to block 485 where a machine learning model may be used to determine test cases. For example, a particular loop or a feature may be added to a method. Accordingly, the machine learning model may identify impact on software performance, and may determine code fixes and test cases to minimize such impact. The machine learning model, may, for example, identify the test cases needed for the performance checks, and retrieve these from test case repository 480. Block 490 may generate at least one test case for each item in the release notes.

Generally, code fixes and test cases may be stored based on historical upgrade data. Accordingly, code fix and test case repository 465 may include code fix repository 475 and test case repository 480. Accordingly, based on an identified item type (e.g., enhancements 415(A), changes 415(B), corrections 415(C), and bug fixes 415(D)), a code fix and a test case may be identified. Test cases may be output to block 485 and code fixes may be output to block 430.

After identifying the code fixes and the test cases, at block 430, the computing platform may apply the machine learning model to identify the code fixes to be applied to the source code. At block 435, identified code fixes are applied to the source code, and identified test cases, from code fix and test case repository 465, are applied to the modified code at block 440. The test output at block 445 is then analyzed at block 450 to determine if the modified code meets expectations of the test case. In some instances, a threshold criterion may be associated with a test case, and the modified source code may be determined to pass or fail the test case based on meeting the threshold criterion for a pass or a fail outcome.

If the modified code does not meet the expectations for a pass outcome, then the computing platform may adjust the code fix at block 460, or may identify additional code fixes and additional test cases by repeating the steps as described herein. For each item in a release notes, several such iterations may be performed before a modified source code is ready for release and deployment. When the modified code meets the expectations for a pass outcome, the modified code is merged into the source code When all tests are good, we merge the code back into the source code at block 455.

In some embodiments, data from results of a fail outcome may be provided by block 460 to code fix and test case repository 465. Also, for example, data from results of a pass outcome may be provided by block 455 to code fix and test case repository 465. In some embodiments, for each item in the release notes, there may be a plurality of identified code modifications. Accordingly, the steps described herein may be performed iteratively for each pair of item and code modification, until that code modification meets the expectations for a pass outcome. The steps are also repeated as each item in the release notes is resolved. In some embodiments, one or more of such steps may be performed concurrently. For example, several items may correspond to a name change for a method call. Accordingly, the computing platform may resolve all changes related to the method call update concurrently.

Figure 3C:
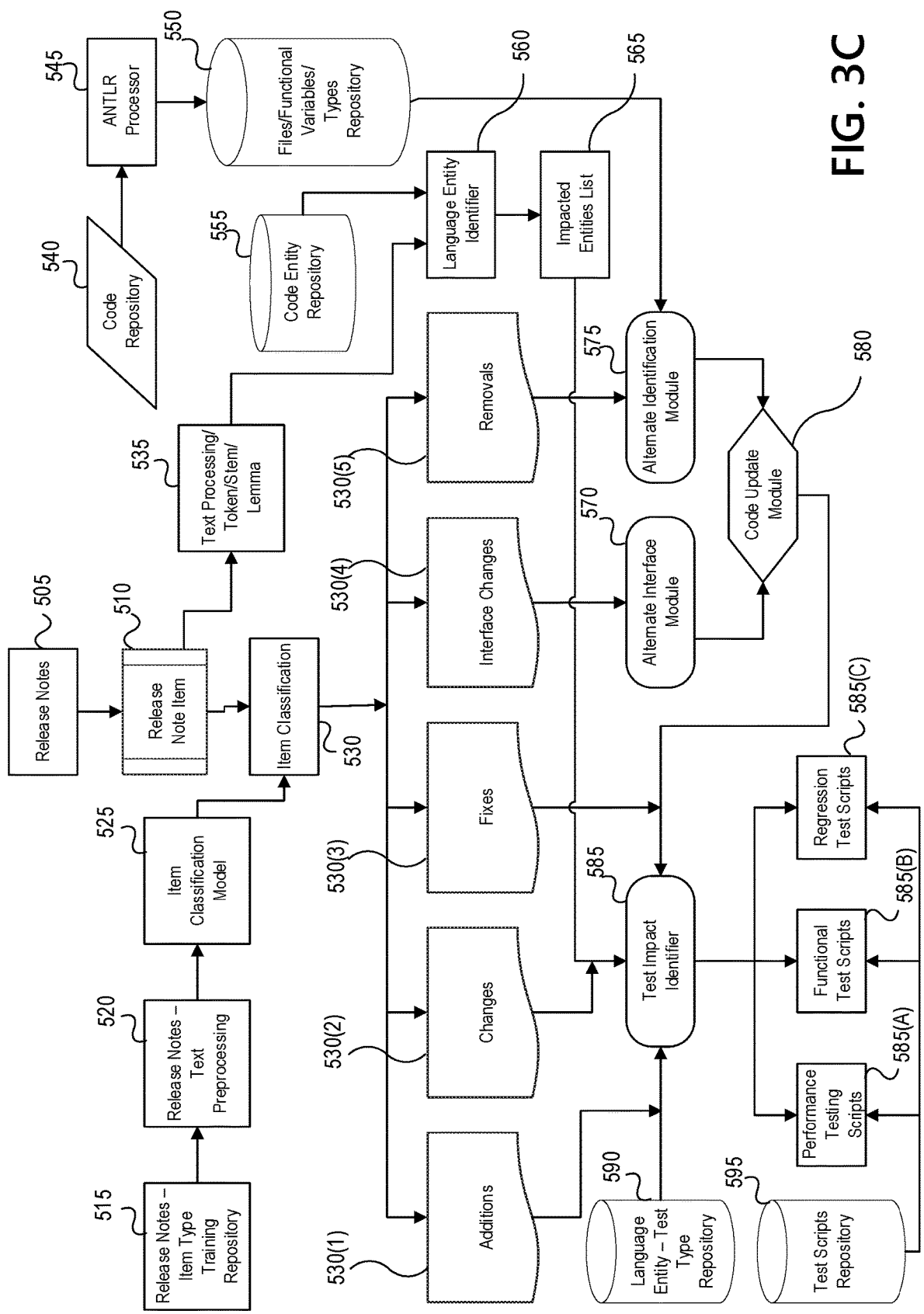

Referring to FIG. 3C, block 505 represents the release notes, and for each release note item represented by block 510, the computing platform may classify the release note item at block 530 as an item type such as an addition 530(1), a change 530(2), a fix 530(3), an interface change 530(4), and a removal 530(5). In some embodiments, an item type training repository 515 may be utilized to identify item types associated with release notes items. In some embodiments, text preprocessing may be performed on the release notes at block 520, and item classification model 525 may classify each release note item into one of the enumerated item types, as described herein.

For the item types such as an addition 530(1), a change 530(2), and a fix 530(3), test impact identifier 585 may identify an impact on the dependent software application. For example, an impact may be a performance change, functional change or a regression change (e.g., for bug fixes). Accordingly, testing scripts may be identified for additions, changes, and fixes. For example, performance testing scripts 585(A) may be identified for a performance change, functional test scripts 585(B) may be identified for a functional change, and regression test scripts 585(C) may be identified for a regression change. In some embodiments, testing scripts may be identified from test scripts repository 595. Also, for example, in some embodiments, test impact identifier 585 may identify an impact on the dependent software application based on historical data from test type repository 590. For example, test impact identifier 585 may retrieve impact information related to different languages, and identify performance change, functional change and/or a regression change based on different languages.

For the item types such as an interface change 530(4), and a removal 530(5), a code update module 580 may be utilized. For example, for an alternate interface may be identified by alternate interface module 570 based on an interface change 530(4). For example, an interface or method named ABC may be changed. For example, a method, previously named "create external table" may be updated to "create external table and view," which is an example of an interface change 530(4). Accordingly, alternate interface module 570 may identify the interface change and may modify the dependent source code in code update module 580.

Similarly, an alternate identification may be identified by alternate identification module 575 based on a removal 530(5). For example, an API may be removed, and alternate identification module 575 may identify the removal, determine an alternate API, and may modify the dependent source code in code update module 580.

In some embodiments, each release note item represented by block 510 may undergo text processing at block 535, such as for example, text processing based on token, stem, lemma, and so forth. The output may be provided to language entity identifier 560. Language entity identifier 560 may also retrieve data from code entity repository 555 which includes a list of all interfaces that may be available. In some embodiments, language entity identifier 560 may generate an impacted entities list represented by block 565, and this list may be provided to test impact identifier 585.

Also, for example, a grammar from code repository 540 may be processed via another tool for language recognition ("ANTLR") at block 545. The output source code may be provided to a repository 550 where files, functional variables, and types associated with the source code may be stored. Generally, a source code may be scanned, processed, and data is stored in repository 550. In some embodiments, alternate identification module 575 may retrieve data from repository 550.

Figure 3D:
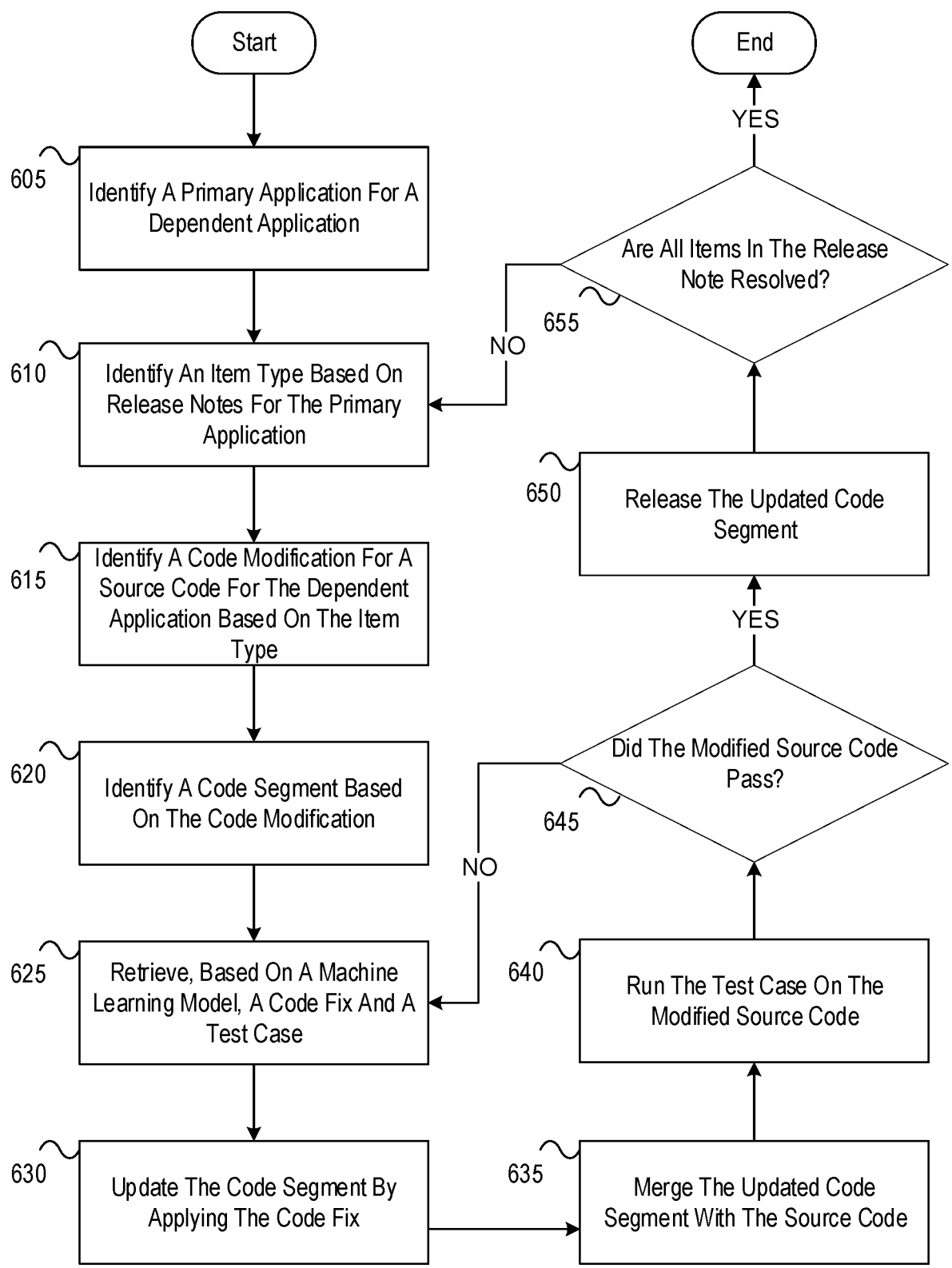

Referring to FIG. 3D, at step 605, a computing platform having at least one processor, a communication interface, and memory may identify, for a first software application (e.g., dependent software application) based on a first source code, a second software application (e.g., a primary software application), where the first software application is dependent on the second software application. The computing platform may then scan a second source code for the second software application, and may parse, via the computing device, release notes associated with the second source code. The release notes may include a plurality of items, and at step 610, the computing platform may classify each item into an item type, and where the item type may be one of an enhancement with a new feature, a bug fix, a removal of an application programming interface, a change to an interface, and a change to an existing feature. At step 615, the computing platform may identify, via the computing device and based on the release notes, a code modification to be performed for the first source code.

At step 620, the computing platform may identify, via the computing device and based on the code modification, a code segment of the first source code. At step 625, the computing platform may retrieve, from a repository and based on a machine learning model, a code fix for the code segment, and a test case based on the code modification. At step 630, the computing platform may update the code segment by applying the code fix. At step 635, the computing platform may merge the updated code segment with the first source code. At step 640, the computing platform may run, via the computing device, the test case on the modified first source code. At step 645, the computing platform may determine if the modified first source code passed the test case. If, at step 645, the computing platform determines that the modified first source code does not pass the test case, then the process may return to step 625 to identify, based on the machine learning model, another code fix for the code segment, and another test case based on the code modification. This process may continue iteratively until the modified first source code passes all the test cases.

If, at step 645, the computing platform determines that the modified first source code passed the test case, then the process may proceed to step 650. At step 650, the computing platform may release the updated code segment for distribution. At step 655, the computing platform may determine if all items in the release notes have been resolved. If, at step 655, the computing platform determines that all items in the release notes have not been resolved, the process returns to step 610. This process may continue iteratively until all the release note items have been resolved successfully, and at step 655, the computing platform determines that all items in the release notes have been resolved.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      identify, via a computing device and for a first software application based on a first source code, a second software application, wherein the first software application is dependent on the second software application and wherein each of the first software application and the second software application is configured to execute separately at one or more computing devices and wherein the first software application executes in conjunction with the second software application executing;
      scan, via the computing device, a second source code for the second software application;
      parse, via the computing device, release notes associated with the second source code;
      identify, via the computing device and based on the release notes, a code modification to be performed for the first source code;
      identify, via the computing device and based on the code modification, a code segment of the first source code;
      retrieve, from a repository and based on a machine learning model:
         a code fix for the code segment, and
         a test case based on the code modification;
      update the code segment by applying the code fix;
      merge the updated code segment with the first source code;
      run, via the computing device, the test case on the modified first source code;
      determine, based on running the test case, a first outcome for the modified first source code; and
      initiate, based on the first outcome, an action related to the first source code.

2. The computing platform of claim 1, wherein the memory stores additional computer-readable instructions that, when executed by the at least one processor, cause the computing platform to:
   generate the test case based on the machine learning model.

3. The computing platform of claim 1, wherein the memory stores additional computer-readable instructions that, when executed by the at least one processor, cause the computing platform to:
generate, based on the first outcome, feedback related to the code fix; and
update, based on the feedback related to the code fix, the repository.

4. The computing platform of claim 3, wherein the memory stores additional computer-readable instructions that, when executed by the at least one processor, cause the computing platform to:
train the machine learning model based on the feedback related to the code fix.

5. The computing platform of claim 1, wherein the memory stores additional computer-readable instructions that, when executed by the at least one processor, cause the computing platform to:
generate, based on the first outcome, feedback related to the test case; and
update, based on the feedback related to the test case, the repository.

6. The computing platform of claim 5, wherein the memory stores additional computer-readable instructions that, when executed by the at least one processor, cause the computing platform to:
train the machine learning model based on the feedback related to the test case.

7. The computing platform of claim 1, wherein the first outcome is a pass outcome, and wherein the initiating the action comprises releasing the updated code segment for distribution.

8. The computing platform of claim 1, wherein the first outcome is a fail outcome, and wherein the initiating the action comprises re-performing the retrieving the code fix and the test case, and wherein the memory stores additional computer-readable instructions that, when executed by the at least one processor, cause the computing platform to:
retrieve, based on the machine learning model, an additional code fix and an additional test case.

9. The computing platform of claim 8, wherein the memory stores additional computer-readable instructions that, when executed by the at least one processor, cause the computing platform to:
continue the re-performing the retrieving the code fix and the test case until the first outcome is a pass outcome.

10. The computing platform of claim 8, wherein the retrieving the additional test case is based on one or more of a regression pack, a performance criterion, a mock test, a functional test, and a page load time.

11. The computing platform of claim 1, wherein the memory stores additional computer-readable instructions that, when executed by the at least one processor, cause the computing platform to:
identify, via the computing device and based on the release notes, an additional code modification to be performed; and
wherein the identifying the additional code modification is re-performed until the release notes are resolved.

12. The computing platform of claim 1, wherein the instructions to identify the code modification comprise additional computer-readable instructions that, when executed by the at least one processor, cause the computing platform to:
determine if the code modification can be performed on the first source code.

13. The computing platform of claim 1, wherein the release notes comprise change logs.

14. The computing platform of claim 1, instructions to parse the release notes comprise additional computer-readable instructions that, when executed by the at least one processor, cause the computing platform to:
parse the release notes based on natural language processing techniques.

15. The computing platform of claim 1, wherein the release notes comprise a plurality of items, and wherein the memory stores additional computer-readable instructions that, when executed by the at least one processor, cause the computing platform to:
classify each item into an item type, and wherein the item type is one of an enhancement with a new feature, a bug fix, a removal of an application programming interface, a change to an interface, and a change to an existing feature; and
wherein the code modification is based on the item type.

16. The computing platform of claim 15, wherein the item type is a change to an interface, and wherein the memory stores additional computer-readable instructions that, when executed by the at least one processor, cause the computing platform to:
identify an alternate interface.

17. The computing platform of claim 15, wherein the item type is a removal of an application programming interface, and wherein the memory stores additional computer-readable instructions that, when executed by the at least one processor, cause the computing platform to:
identify a replacement application programming interface.

18. The computing platform of claim 1, wherein the memory stores additional computer-readable instructions that, when executed by the at least one processor, cause the computing platform to:
determine, based on the release notes about the second software application, a performance impact on the first software application; and
identify, based on the machine learning model, a test case to mitigate the performance impact.

19. The computing platform of claim 1, wherein the memory stores additional computer-readable instructions that, when executed by the at least one processor, cause the computing platform to:
determine the first outcome based a first predetermined threshold for passing the test case.

20. The computing platform of claim 19, wherein the memory stores additional computer-readable instructions that, when executed by the at least one processor, cause the computing platform to:
determine whether the first predetermined threshold is within a range of a statistical parameter when determining the first outcome.

21. The computing platform of claim 19, wherein the memory stores additional computer-readable instructions that, when executed by the at least one processor, cause the computing platform to:
determine the first outcome based a second predetermined threshold for failing the test case.

22. The computing platform of claim 21, wherein the memory stores additional computer-readable instructions that, when executed by the at least one processor, cause the computing platform to:
in response to the determining the first outcome when failing the test case, retrieving an additional code fix and an additional test case;

update the code segment by applying the additional code fix;

merge the updated code segment with the first source code;

run the additional test case on the modified first source code;

determine, based on running the additional test case, a second outcome for the modified first source code; and repeating the retrieving, updating, merging, running, and determining until the additional test case passes.

23. A method, comprising:

at a computing platform comprising at least one processor, a communication interface, and memory:

scanning, via a computing device, a first source code for a first software application;

identifying, via the computing device and based on release notes associated with the first source code, an item type;

identifying, via the computing device and based on the item type, a code modification to be performed on a second source code associated with a second software application, wherein the second software application is dependent on the first software application and wherein each of the first software application and the second software application is configured to execute separately at one or more computing devices and wherein the first software application executes in conjunction with the second software application executing;

identifying, via the computing device and based on the code modification, a code segment of the second source code;

retrieving, based on a machine learning model and from a repository:
a code fix for the code segment, and
a test case associated with the code modification;

updating the code segment by applying the code fix;

merging the updated code segment with the second source code;

running, via the computing device, the test case on the modified second source code;

determining, based on the running the test case, an outcome for the modified second source code; and initiating, based on the outcome, an action related to the second source code.

24. One or more non-transitory computer-readable media storing instructions that, when executed by a computing platform comprising at least one processor, a communication interface, and memory, cause the computing platform to:

identify, via a computing device and for a first software application based on a first source code, a second software application, wherein the first software application is dependent on the second software application and wherein each of the first software application and the second software application is configured to execute separately at one or more computing devices and wherein the first software application executes in conjunction with the second software application executing;

scan, via the computing device, a second source code for the second software application;

retrieve, from a web resource, release notes associated with the second source code;

parse, via the computing device, the release notes;

identify, via the computing device and based on the parsing the release notes, a code modification to be performed;

identify, via the computing device and based on the code modification, a code segment of the first source code;

retrieve, based on a machine learning model:
a code fix for the code segment, and
a test case associated with the code modification;

update the code segment by applying the code fix;

merge the updated code segment with the first source code;

run, via the computing device, the test case on the modified first source code;

determine, based on the running the test case, an outcome for the modified first source code; and initiate, based on the outcome, an action related to the first source code.

* * * * *